(12) United States Patent
Kuwabara

(10) Patent No.: US 7,534,042 B2
(45) Date of Patent: May 19, 2009

(54) LINEAR MOTION GUIDE UNIT

(75) Inventor: Hideki Kuwabara, Mino (JP)

(73) Assignee: Nippon Thompson Co., Ltd., Tokyo (JP)

( * ) Notice: Subject to any disclaimer, the term of this patent is extended or adjusted under 35 U.S.C. 154(b) by 321 days.

(21) Appl. No.: 11/502,368

(22) Filed: Aug. 11, 2006

(65) Prior Publication Data

US 2007/0053619 A1    Mar. 8, 2007

(30) Foreign Application Priority Data

Sep. 6, 2005   (JP)  ............................ 2005-257343
Jul. 14, 2006   (JP)  ............................ 2006-193729

(51) Int. Cl.
     *F16C 29/06*    (2006.01)

(52) U.S. Cl. .......................................... 384/13; 384/44

(58) Field of Classification Search .................. 384/13, 384/43–45
See application file for complete search history.

(56) References Cited

U.S. PATENT DOCUMENTS

| | | | | |
|---|---|---|---|---|
| 5,399,023 | A | * | 3/1995 | Winkelmann et al. ......... 384/13 |
| 5,496,113 | A | * | 3/1996 | Winkelmann et al. ......... 384/13 |
| 6,024,490 | A | * | 2/2000 | Shirai ........................... 384/13 |
| 6,123,457 | A | * | 9/2000 | Suzuki et al. ................. 384/13 |
| 6,155,717 | A | * | 12/2000 | Michioka et al. .............. 384/15 |
| 6,203,199 | B1 | * | 3/2001 | Pfeuffer ........................ 384/45 |
| 6,250,804 | B1 | * | 6/2001 | Hsu et al. ..................... 384/13 |
| 7,066,650 | B2 | * | 6/2006 | Ishihara ....................... 384/44 |

FOREIGN PATENT DOCUMENTS

| | | |
|---|---|---|
| DE | 44 24 795 A1 | 9/1995 |
| EP | 0 905 395 A | 3/1999 |
| EP | 1 645 763 A | 4/2006 |
| JP | 5-71443 | 9/1993 |
| JP | 05 071443 U | 9/1993 |
| JP | 11-22726 | 1/1999 |
| JP | 11-93952 | 4/1999 |
| JP | 2006-105310 | 4/2006 |

OTHER PUBLICATIONS

European Search Report dated Jul. 29, 2008.

* cited by examiner

*Primary Examiner*—Thomas R Hannon
(74) *Attorney, Agent, or Firm*—Browdy and Neimark, P.L.L.C.

(57) ABSTRACT

A linear motion guide unit is disclosed in which the lubrication points of lubricant around a rolling element are made in a turnaround passage to ensure proper and steady lubrication by the lubrication system simple in construction, with accompanying sustainable maintenance-free condition for lubrication. A hole open to the turnaround passage is bored through an outward end surface of an end cap. A lubricant reservoir of porous compact product fits into a recess made in the outward end surface of the end cap. The lubricant reservoir has noses protruding to fit into the hole in the outward end surface of the end cap to expose itself to the turnaround passage in such a way forming a part of the curved wall of the associated turnaround passage. The noses come into rolling-touch with the rollers as they roll through the turnaround passage, applying the rollers with lubricant delivered from the noses.

10 Claims, 8 Drawing Sheets

LINEAR MOTION GUIDE UNIT

FIELD OF THE INVENTION

The present invention relates to a linear motion guide unit comprised of an elongated guide rail, and a slider that is allowed to move on the elongated guide rail relatively to the guide rail by virtue of more than one rolling element.

BACKGROUND OF THE INVENTION

Linear motion guide units have been extensively incorporated in recent years between relatively sliding parts in increased industrial fields including machine tools, various assembling machines, conveyors, and so on. Most prior linear motion guide units have been ordinarily fed with lubricant every a preselected interval based on maintenance schedules to make certain of forming the lubricant film separating the rolling elements from the circulating race, ensuring continuous smooth rolling motion of the rolling elements throughout a circulating circuit. Recently advanced machines and instruments, nevertheless, are increasingly needed to make them virtually maintenance-free from many aspects of conserving energy as well as keeping running cost and maintenance cost of equipment reasonable. Correspondingly, the linear motion guide units incorporated in the advanced machinery, especially the linear motion guide units of the sort of roller bearings are also challenged to keep the consumption of lubricant to a minimum, along with keeping linear motion guide units virtually maintenance free for long-lasting lubrication. Most conventional linear motion guide units are composed of an elongated guide rail and a slider that moves relatively to the guide rail by virtue of more than one rolling element, which is allowed to roll through a recirculating circuit that is made up of a load-carrying race defined between the guide rail and the slider, and a non-loaded area including a return passage and forward and aft turnaround passages made in the slider. With the linear motion guide units constructed as stated earlier, continuous application of lubricant on or between the load-carrying race and the rolling element is inevitable to continue maintaining an adequate lubricant film between the load-carrying race and the rolling element to keep them against metal-to-metal contact that might otherwise occur, thereby making sure of their high durability.

In the commonly assigned Japanese Patent Laid-Open No. H11-93952, there is disclosed a linear motion guide unit in which a lubricant applicator is provided with lubricating plates that are so constructed as to make their handling work including attachment and/or detachment from the guide rail easier. The lubricant applicator built in the prior linear motion guide unit is composed of a casing secured on an outward end surface of an end cap and lubricating plates made of sintered resinous members of porous or cellular texture whose interstices are filled with lubricant. The lubricating plates are harbored in the casing in a geometric relation that their raised tips are urged directly against raceway grooves on a guide rail to come into sliding engagement with the raceway grooves, keeping continuing lubricant application to the raceway grooves. With the prior linear motion guide unit whose lubricating plates constantly comes into sliding engagement with their associated raceway grooves, a major problem would raise that the sliding friction due to the engagement of the lubricating plates with the raceway grooves causes much sliding resistance acting on the slider. As a result, it will be understood that the linear motion guide units with the lubricating plate constructed as cited above are unfit for the machines or apparatus to be operated at high speed, where the linear motion guide units incorporated is needed to drive their sliders with high traveling speed.

Another Japanese Patent Laid-Open No. H11-22726 discloses a linear motion guide unit in which a slider having a movable body including a table, and so on thereon is allowed to move along a guide rail as more than one ball or roller built in the slider rolls through a circulating circuit. With the prior linear motion guide unit recited earlier, end seals adapted to be secured to forward and aft ends of the slider are each provided therein with a lubricant port and a lubricant groove communicating with the lubricant port while made open to a turnaround passage. The lubricant groove is rimmed evenly with raised edges to prevent the lubricant from leaking out through between the mating surfaces of the end seal and the associated end of the slider.

A further another linear motion guide means operational with less lubricant supply is disclosed in Japanese Utility Motel Laid-Open No. H05-71443, which is envisaged delaying the time interval for lubricant supply into a bath, thereby reducing the lubricant supply cycles to simplify lubricant supply operation with accompanying reduced maintenance for lubrication. With the prior linear motion guide unit recited earlier, enclosed lubricant reservoirs fit into their associated recesses cut in the outward surfaces of the forward and aft end caps. The lubricant reservoirs are made to communicate with the turnaround passages of the ball circulating circuit. The lubricant reservoirs are made integrally with spouts that are made to lead the lubricant out of the reservoirs into their mating lubricant paths made open to the turnaround passages. The lubricant enough in amount to prevent scuffing and wear in the ball circulating circuit may reach the turnaround passages through the combined spouts and lubricant paths. With the prior linear motion guide unit constructed as stated earlier, thus, the lubricant reservoir to hold the lubricant therein is needed, and the spouts of the reservoir have to be placed as close as possible to the turnaround passages to make sure of smooth flow of the lubricant out of the lubricant reservoir.

Another commonly assigned Japanese Patent Laid-Open No. 2006-105310 discloses a linear motion guide unit usually classified as a roller type using rollers as the rolling elements, which can work for long-lasting service life with accompanying substantive maintenance-free for lubrication. With the linear motion guide unit recited here, the return passage is constituted with a tubular composition made up of a tubular skeleton made therein with window, and a cellular molded member that fits into the window in the tubular skeleton. The tubular composition to provide the return passage in the prior linear motion guide unit is high in mechanical stiffness and also suited to provide steady application of lubricant around the rolling elements rolling through the return passage, ensuring positive lubrication over a long-term operation with reduced maintenance or maintenance-free. However, the tubular composition constructed as stated earlier is too sophisticated for production. The return passage is defined inside a hole of the tubular composition installed in a fore-and-aft bore made in a carriage of a slider. The tubular composition is composed of the tubular skeleton made therein with windows, and the cellular molded members that fit in the windows. The rolling elements of cylindrical roller, when coming into rolling-contact with the cellular members while rolling through the return passage, are applied with lubricant film. There, it remains a major challenge to develop any linear motion guide unit that is capable of reserving ample quantity of lubricant irrespective of more simplified in construction than the prior art as stated earlier.

Meanwhile, there are two members of the class of linear motion guide units, one of which has balls and the other has cylindrical rollers. With the linear motion guide unit in which cylindrical rollers are selected as the rolling elements, alignment problems to guide rollers in good rolling order without leaning in rolling posture are more encountered, compared with the construction using balls. To cope with this, the cylindrical rollers have to be guided not only on their circular rolling surfaces, but also on their axially opposite end surfaces. Conventionally, there is no linear motion guide unit constructed to meet with an aspect of allowing the rollers to roll through the circulating circuit over a long-lasting service life with adequate application of lubricant, making certain of steady reliability of the maintenance-free on lubricant application. Advanced technology has come to hope a linear motion guide unit which, even though simple in construction in favor of commercial production, is capable of retaining ample lubricant enough to make sure of steady and sustainable lubrication over a long-lasting service life for the cylindrical rollers that roll through a circulating circuit.

SUMMARY OF THE INVENTION

The present invention has for its primary object to overcome the major challenges as stated earlier, and to provide a linear motion guide unit having a lubrication system which, although made simple in construction for easier production, is suited to achieve sustainable maintenance-free operation for steady lubrication to rolling elements. More particularly, the present invention provides a linear motion guide unit in which the lubrication system is made of a cellular or porous member capable of retaining lubricant therein, the cellular member being installed to apply lubricant around the rolling elements as they roll through a turnaround passage of a circulating circuit in a slider. To this end, the cellular or porous member is placed in a way protruding partially into the turnaround passage to constitute in part a circular inside wall defining the turnaround passage. Thus, the rolling elements, during rolling through the turnaround passage, are allowed coming into rolling-touch with the cellular or porous member exposed into the turnaround passage to receive lubricant film from the cellular member.

The present invention is concerned with a linear motion guide unit; comprising an elongated guide rail, a slider movable lengthwise of the elongated guide rail in a sliding manner, and more than one rolling element running through a load-carrying race defined between the guide rail and the slider, the rolling element being allowed to roll through a circulating circuit made up of the load-carrying race, a return passage made in the slider in parallel with the race, turnaround passages joining the race and the return passage together with one another; wherein the slider is provided on forward and aft end surfaces thereof with lubricant reservoirs of porous compact impregnated with lubricant, the forward and aft end surfaces being each made with a hole open to the associated turnaround passage, and the lubricant reservoirs being each provided with a nose that extends into the hole in a way exposing its tip end to the turnaround passage to define partially a wall surface of the turnaround passage, coming into rolling-contact with the rolling element rolling through the turnaround passage to apply the lubricant on the rolling element.

In another aspect of the present invention, there is disclosed a linear motion guide unit in which the porous compact for the lubricant reservoir is made of sintered resinous member that are prepared by compacting finely powdery ultrahigh molecular weight synthetic resin under pressure together with the application of heat, the resulting sintered resinous member having open-porous texture in which pores are made open to each other through interstices among resinous particles inside the sintered member, and wherein the lubricant fills in the pores.

In another aspect of the present invention, there is disclosed a linear motion guide unit in which the slider is comprised of a carriage has the return passage and a raceway groove to form the load-carrying race, forward and aft end caps arranged to provide the forward and aft end surfaces and made therein with the turnaround passages, and end seals applied over the lubricant reservoirs lying on the forward and aft end surfaces of the end caps and fastened to the carriage.

In another aspect of the present invention, there is disclosed a linear motion guide unit in which the lubricant reservoirs are made to spread across nearly the entire of the forward and aft end surfaces of the end caps.

In a further another aspect of the present invention, a linear motion guide unit is disclosed in which a pair of the circulating circuits is made in each of widthwise opposing sides of the end caps, wherein the turnaround passages of the paired circulating circuits intersect each other in the end caps in staggered relation in sliding direction of the slider, and wherein the lubricant reservoirs are placed in the end caps, one to each end cap, in a way one of the lubricant reservoirs applies the lubricant around the rolling element rolling through one of the paired turnaround passages while the other lubricant reservoir applies the lubricant around the rolling element rolling through the other of the paired turnaround passages.

In another aspect of the present invention, there is disclosed a linear motion guide unit in which the paired turnaround passages are staggered one another in a sliding direction of the slider to provide an outward turnaround passage and an inward turnaround passage which are spaced apart away from one another in the end caps, and wherein the noses of the lubricant reservoirs expose themselves to the respective outward turnaround passages.

In a further another aspect of the present invention, there is disclosed a linear motion guide unit in which the noses of the lubricant reservoirs exposed to the turnaround passages are each formed to have an exposed crown of elliptic figure whose major axis lies in parallel with the traveling direction of the rollers to ensure rolling-contact with the rollers over a long distance enough to apply significant lubricant to the rollers.

In another aspect of the present invention, a linear motion guide unit is disclosed in which the lubricant reservoirs are each made up of a major plate and a nose that is made either integral with the major plate or separately from the major plate, followed by joined with the major plate. As an alternative, the lubricant reservoir is made up of a major plate bored with a hole, and a nose made separately from the major plate, followed by fitted into the hole in the major plate.

In another aspect of the present invention, there is disclosed a linear motion guide unit in which the rolling element is either a roller or a ball.

In a further another aspect of the present invention, there is disclosed a linear motion guide unit in which the outward end surfaces of the end caps sink leaving outside edges to make outside frames, and wherein the lubricant reservoirs fit into recesses defined with the outside frames. As an alternative, the outward end surfaces of the end caps sink leaving inside edges to make inside frames, besides the outside edges to make the outside frames, and wherein the lubricant reservoirs fit into recesses defined between the outside frames and the inside frames.

With the linear motion guide unit of the present invention, the lubricant reservoirs of porous compact are placed on the outward end surfaces of the slider, especially, of the forward and aft end caps. The outward end surfaces of the end caps are bored with holes that are open to the turnaround passages while the lubricant reservoirs have the noses protruding to fit into the holes in the outward end surfaces of the end caps to expose themselves to the turnaround passages in such a way forming partially the curved walls of the associated turnaround passages. Moreover, the porous compact product for the lubricant reservoir has open-porous or cellular texture in which pores or cells are made open to each other through interstices or channels. The noses come into rolling-touch with the rollers as they roll through the turnaround passages, applying the rollers with lubricant delivered from the noses. Thus, the linear motion guide unit of the present invention ensures proper and steady lubrication by the lubrication system simple in construction, with accompanying sustainable maintenance-free condition for lubrication.

DETAILED DESCRIPTION OF THE PREFERRED EMBODIMENTS

Figure 1:
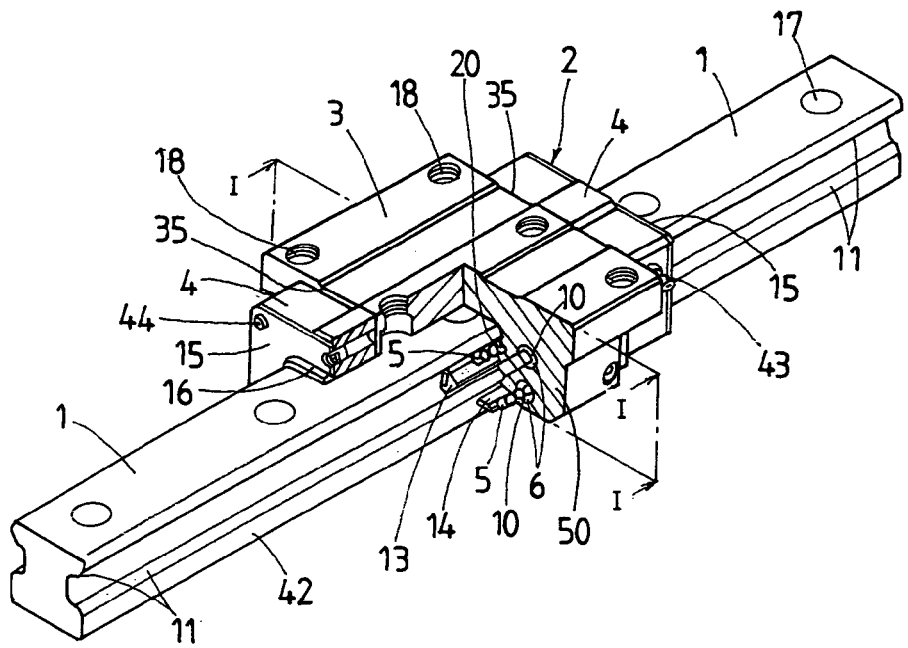
FIG. 1 is a partially cutaway view in perspective illustrating a preferred embodiment of a linear motion guide unit according to the present invention.

The linear motion guide unit according to the present invention is adapted for use in any relatively sliding components in machinery as diverse as machine tools, various assembling machines, conveyers, robotic machines, semiconductor equipment, measurement/inspection instruments, medical instruments, micromachines, and so on. The present invention is envisaged developing especially the linear motion guide unit, which can cope with demand to keep better lubrication to the rolling elements over long-lasting operation to make sure of smooth movement of the rolling elements throughout the circulating circuit even with maintenance-free condition for lubricant replenishment.

The linear motion guide unit constructed according to the present invention is mainly comprised of an elongated guide rail 1, a slider 2 fitting over the guide rail 1 for lengthwise sliding movement relatively to the guide rail 1, and more than one rolling element allowed rolling through a looped circulating circuit 49, which is made up of a load-carrying race 20 defined between the guide rail 1 and the slider 2, a return passage 10 made in the slider 2 in a direction parallel with the race 20, and forward and aft turnaround passages 30 joining the race 20 and the return passage 10 together with one another. Especially, the linear motion guide unit of the present invention features substantially free of maintenance for lubrication to the rolling elements. In the versions of the present invention referred hereinafter, although but the lubricating system of application of lubricant to the rolling elements is explained in one of two members of the class of linear motion guide units in which the rollers 5 are selected as rolling elements, it will be appreciated that the lubricating system, if lubrication points are in the turnaround passages, may be likewise used in the other member of the class in which the balls are replaced by the rollers.

Figure 2:
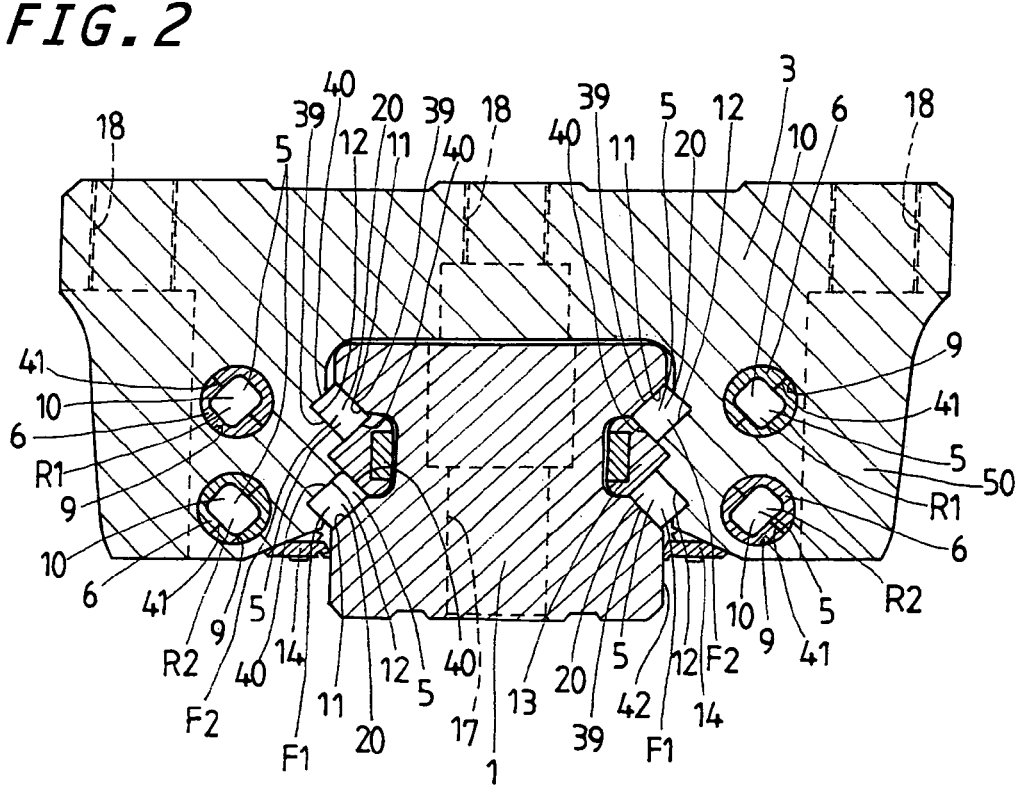
FIG. 2 is a view in transverse section along a plane I-I of FIG. 1 showing the linear motion guide unit.

The linear motion guide unit of the present invention is composed of the elongated guide rail 1 made on each lengthwise side 42 thereof with a pair of raceway grooves 11, and a slider 2 having sidewise opposing bulgy portions 50 that fit over or conform to the guide rail 1 in a way to travel relatively to the guide rail 1 by virtue of more than one rolling element of roller 5, which is allowed rolling through the looped circulating circuits 49 each of which is made up of the load-carrying race 20 defined between the guide rail 1 and the slider 2, the return passage 10 made in the slider 2 in the direction parallel with the race 20, and the forward and aft turnaround passages 30 joining the race 20 and the return passage 10 together with one another. The slider 2 is mainly composed of a carriage 3 whose sidewise opposing bulgy portions 50 are each made thereon with a pair of raceway grooves 12 lying in opposition to the raceway grooves 11 on the guide rail 1, and forward and aft end caps 4 disposed on lengthwise opposing outward surface 47 of the carriage 3 and further made therein with the turnaround passages 30 (30A, 30B) to join the upside and downside races 20 to their associated upside and downside return passages 10, respectively, end seals 15 secured to outward surfaces 47 of the end caps 4 and further provided with lips 16 to close clearances between the guide rail 1 and the slider 2, and more than one roller 5 allowed rolling through the circulating circuits 49. The slider 2, as shown in FIG. 2, has the paired circulating circuits 49 in the sidewise opposing bulgy portions 50 thereof, respectively. With the linear motion guide unit of the present invention, a pair of upside and downside raceway grooves 11, as shown in FIG. 1, is cut in respective sides 42 of the guide rail 1 while the carriage 3 has the raceway grooves 12 in opposition to the raceway grooves 11. Thus, the paired upside and downside load-carrying races 20 lying apart from one another in vertical direction as shown in FIG. 2 are defined between the raceway grooves 11 on the guide rail 1 and the raceway grooves 12 on the carriage 3.

Figure 3:
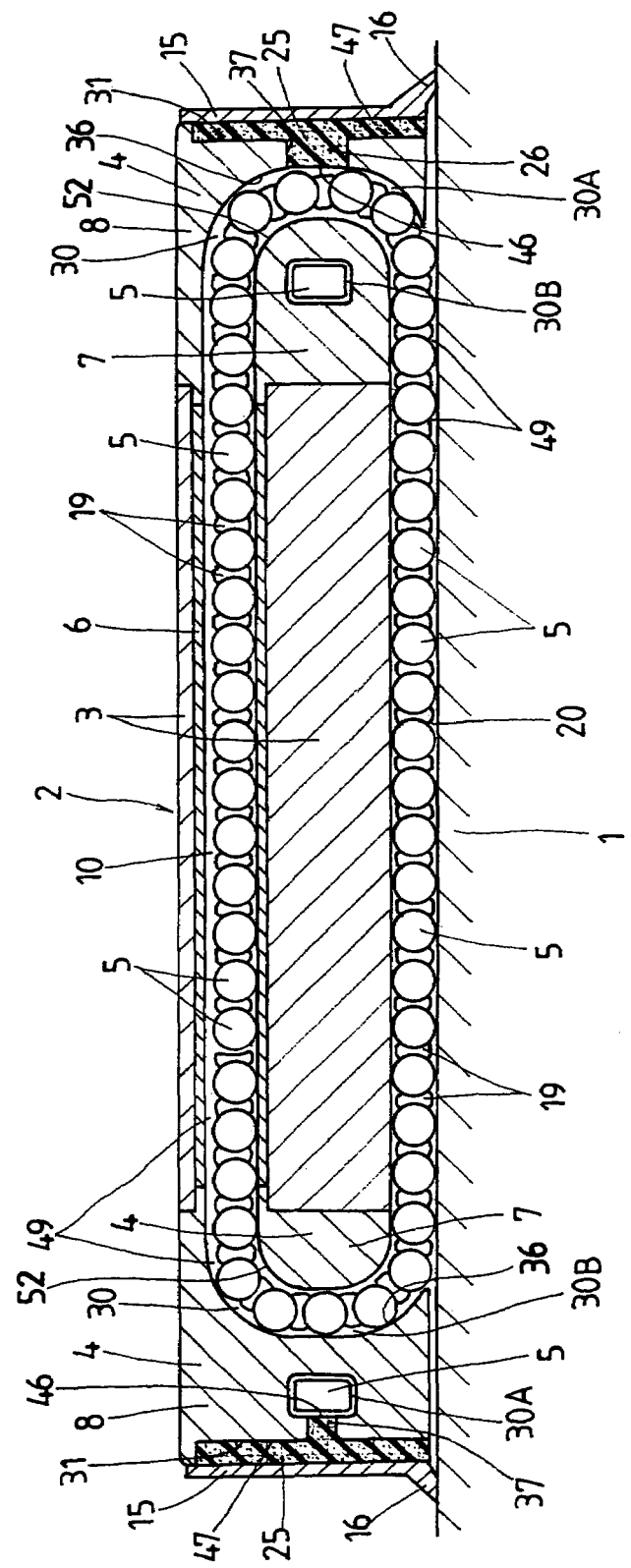
FIG. 3 is a view in longitudinal section showing a slider in the linear motion guide unit of FIG. 1.

With the linear motion guide unit constructed as stated earlier, the rollers 5 rolling through one of the paired circulating circuits 49 are allowed to transfer from the downside race 20, carrying downward load because of the slider 2, into the associated return passage 10 in the carriage 3 in a circulating manner. In contrast, the rollers 5 rolling through the other of the paired circulating circuits 49 are allowed to transfer from the upside race 20, carrying upward load because of the slider 2, into the associated return passage 10 in the carriage 3 in a circulating manner. A retainer plate 13 is arranged between the paired upside and downside races load-carrying races 20 in a way extending across the carriage 3 and the end caps 4. When the rollers 5 are straight cylinders, they are born on either one of axially opposite ends 40 thereof in sliding-contact relation against the retainer plate 13, while come into rolling-contact around their circular outside surfaces 39 with the races 20. One of the paired circulating circuits 49, as shown in FIG. 3, is made up of one of the paired load-carrying races 20, the associated return passage 10, and a shorter one 30B of the turnaround passages and a longer one 30A of the turnaround passages. In contrast, the other of the paired circulating circuits 49, although not shown aside from the turnaround passages 30, includes the other load-carrying race similar to the race 20, the other return passage similar to the return passage 10, and a longer one 30A of the turnaround passages and a shorter one 30B of the turnaround passages. The circulating circuits 49 are intersected with one another in a way staggered from each other in lengthwise direction. Thus, the forward and aft end caps 4 are each made in their left side bulgy portions 50 in FIG. 3 with the shorter turnaround passage 30B and the longer turnaround passage 30A intersecting with one another in a way staggered from each other in lengthwise direction, while in their right side bulgy portions 50 in FIG. 3 with the longer turnaround passage 30A and the shorter turnaround passage 30B intersecting with one another in a way staggered from each other in lengthwise direction. Separators 19, as shown in FIG. 3, are each interposed between any two adjoining rollers 5 to keep the rollers 5 against direct collision of them.

Figure 7:
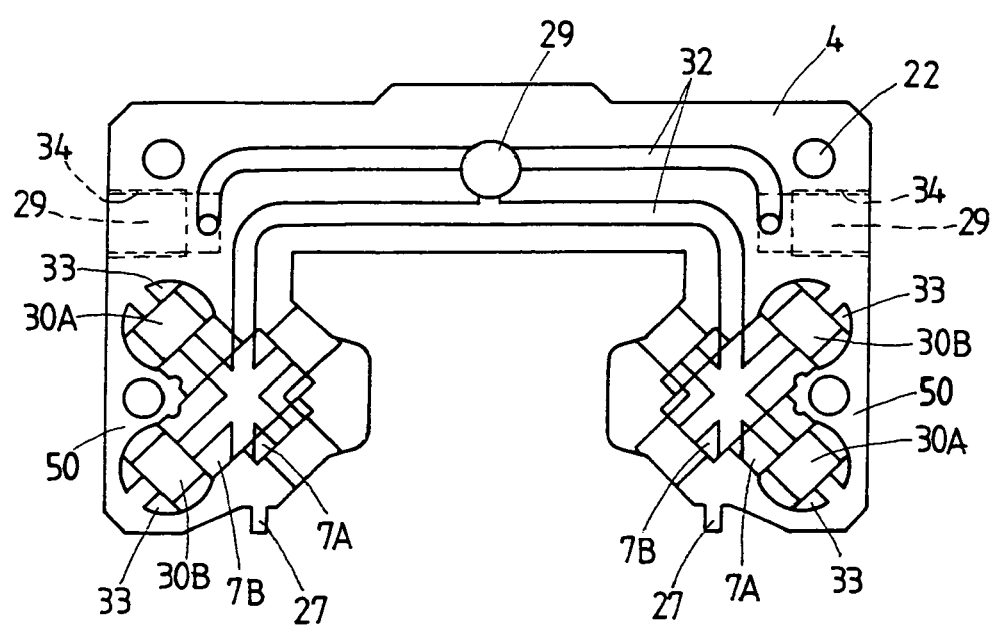
FIG. 7 is a view in rear elevation showing the end cap of FIG. 5.

With the linear motion guide unit of the present invention, moreover, a lower seal 14 is disposed to extend over the underneath of the carriage 3 and the forward and aft end caps 4 while the end seals 15 are attached to the outward end surfaces of the end caps 4, so that the slider 2 is sealed effectively against outside atmosphere. The end caps 4 are made therein with lubrication ports 29 to feed lubricant into the circulating circuits 49 through oiling paths 32, which are also made in the end caps 4. The lubrication ports 29 are provided by internally threaded holes 28 that fit over their associated grease nipples 43, one of which is shown as being positioned in a flank of the end cap 4 in FIG. 1. Moreover, the guide rail 1 is made with some holes 17 that are used to fasten the guide rail 1 to any stationary bed including a machine bed, mounting base, workbench, other counterpart, and so on, while the carriage 3 of the slider 2 is made therein with some threaded holes 18 that are used to fasten the slider 2 to any component including a workpiece, a variety of instruments, and so on. On the end caps 4, there are made with raised portions 27 below the underneath of the end cap 4 to hold in place the lower seal 14, and also bolt holes 22 at four corners of the end caps 4 to allow bolts to fasten the end caps 4 to the carriage 3. The end caps 4, as shown in FIG. 7, are each made at the middle area 23 thereof with the central lubrication port 29 to introduce the lubricant from the grease nipple 43 in the end cap 4, and further have the oiling paths 32 to connect the lubrication port 29 to the turnaround passage 30 in the associated circulating circuit 49. With the linear motion guide unit constructed as stated earlier, the rollers 5 are allowed to roll through their respective load-carrying races 20 in a way the member of the rollers 5 rolling through the upside race 20 goes into the downside return passage 10 while the other member of the rollers 5 rolling through the downside race 20 transfers to the upside return passage 10, whereby the slider 2 moves relatively to the guide rail 1 in a sliding manner.

The return passage 10 is constituted with a circular hole defined inside a sleeve 6 that fits into a fore-and-aft bore 9 made in the carriage 3 of the slider 2. The sleeve 6 is made of sintered resinous tubular member having cellular or porous structure, whether monolithic or split at 41 into two halves. As an alternative, the sleeve 6 may be replaced by the tubular composition constructed as stated in the commonly assigned Japanese Patent Laid-Open No. 2006-105310 recited earlier. The tubular composition is composed of a tubular skeleton responsible for giving mechanical strength or stiffness to the tubular composition itself, and cellular or porous members high in capability of soaking up and retaining lubricant in cells or pores to lubricate adequately the rollers 5, the cellular members fitting into the tubular skeleton. The sleeve 6, although fitting loosely in the fore-and-aft bore 9, is held in accurate place by spigots 33 raised above the end caps 4, which extend beyond forward and aft end faces 35 of the carriage 3 into the fore-and-aft bore 9 to come into abutment against the forward and aft ends of the sleeve 6.

Figure 6:
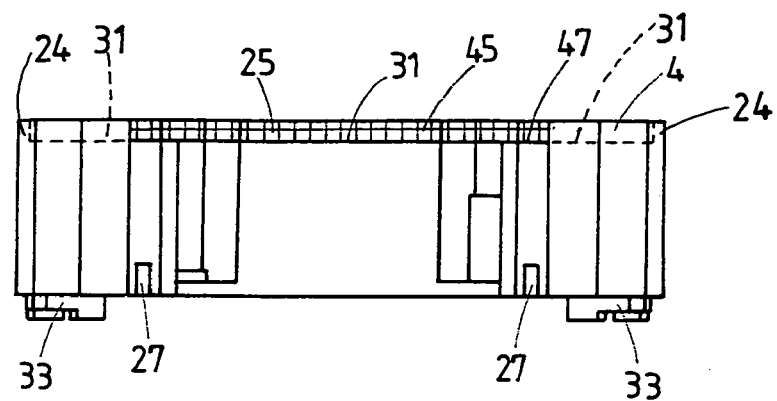
FIG. 6 is a view in bottom showing the end cap of FIG. 5.
Figure 8:
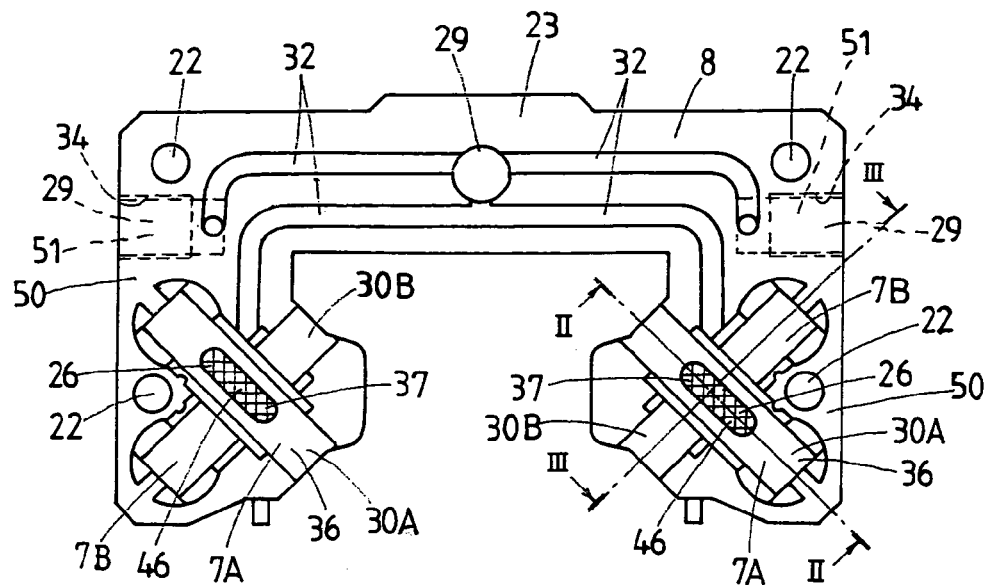
FIG. 8 is a view in rear elevation of an end cap major part, but in which a spacer part is removed from the end cap of FIG. 7.

The end cap 4, as shown in FIGS. 6 to 8, is comprised of spacer parts 7A and 7B to define inside curved halves 52 of the turnaround passages 30, and an end cap major part 8 to define outside curved halves 36 of the turnaround passages 30. Interlocking combinations of the spacer parts 7A for the longer turnaround passages 30A and the spacer parts 7B for the shorter turnaround passages 30B fit into their complementary recesses in the end cap major part 8 at the rear of the end cap 4 in a way the spacer parts 7A and 7B are crossed each other and staggered one another in lengthwise direction. After the combinations of spacer parts 7A and 7B have been nested in the end cap major part 8, the outside curved halves 36 lying in the end cap major part 8 come into mating with the inside curved halves 52 made in the spacer parts 7A and 7B to complete the turnaround passages 30. Upon assembling, as shown in FIGS. 7 and 8, the spacer part 7A fits into the recess in the left-side bulgy portion 50 of the end cap 4, and then the spacer part 7B is nested inside the spacer part 7A in an intersecting relation with one another to thereby finish building both the longer and shorter turnaround passages 30A and 30B, which are crossed each other while staggered in lengthwise direction. Thus, the spacer parts 7A are prepared for the longer turnaround passages 30A while the other spacer parts 7B are prepared for the shorter turnaround passages 30B and nested in the spacer parts 7A to intersect with one another. With the linear motion guide unit constructed as stated earlier, the paired circulating circuits 49 in any one sidewise bulgy portion 50 of the slider 2 are each made up of the load-carrying race 20, the return passage 10, the longer turnaround passage 30A defined by the end cap major part 8 and the spacer part 7A, and the shorter turnaround passage 30B defined by the spacer parts 7A and 7B.

Figure 9:
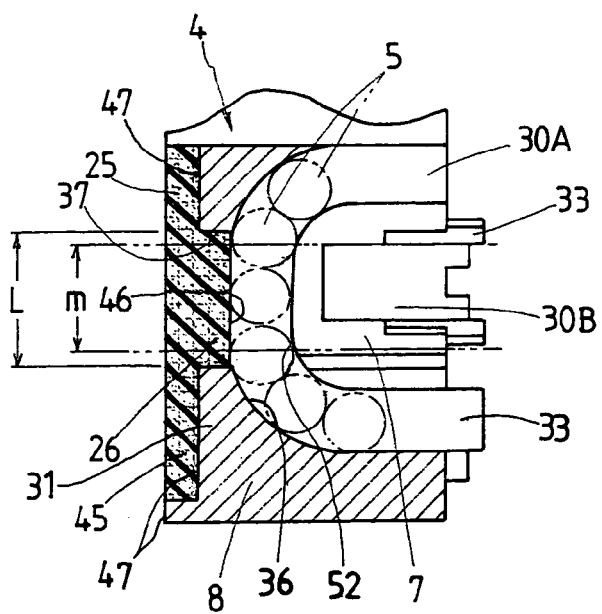
FIG. 9 is a view in transverse section of the end cap major part, the view being taken on the plane of the line II-II of FIG. 8.
Figure 10:
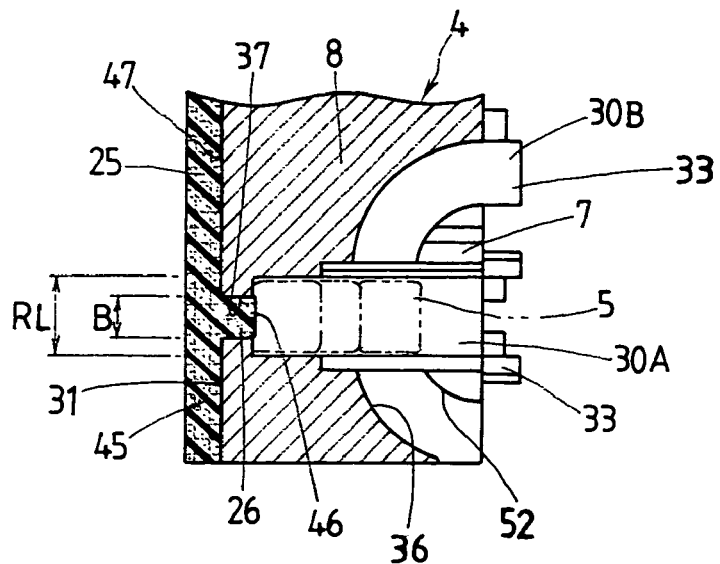
FIG. 10 is a view in transverse section of the end cap major part, the view being taken on the plane of the line III-III of FIG. 8.

The end cap major part 8, as shown in FIGS. 9 and 10, is provided with spigots 33 extending into abutment against the associated return passages 10. The spigots 33 are made integral with the outside curved halves 36 of the turnaround passages 30 to conjoin with the spacer parts 7A and 7B, thereby communicating with the return passages 10 to connect the turnaround passages 30 in the end cap 4 to their associated return passages 10 in the carriage 3 with smoothness. On the rear surface of the end cap 4, as shown in FIG. 7, there are made the oiling paths 32 connecting with the lubrication port 29 while opening to specific areas where the turnaround passages 30 are bounded on any of the load-carrying races 20 and the return passages 10. The end cap 4 is made therein with the lubrication ports 29, some of which are made in the middle area, and the other are on the sides of the end cap 4. All lubrication ports 29 but one put to lubrication use are plugged with closures 51 that fit into the internally threaded holes 28 or 34 made in the end cap 4. The end cap 4, after tentatively positioned relatively to the carriage 3, is joined to the carriage 3 with the bolts 44 that extend through the bolt holes 22. Abutment of the sleeve 6 against the spigots 33 of the end cap 4 keeps accurate location of the end cap 4 to the sleeve 6, making sure of precise alignment of the spigots 33 of the end cap 4 with the return passages 10 in the carriage 3. Thus, construction the sleeves 6 and the spigots 33 of the end cap 4 come into flush abutment each other end to end makes certain of finishing the circulating circuits 49 of rectangle in transverse section, which transfer from the return passages 10 to the spigots 33 in the end cap 4 without causing any discontinuity or gap at the connection between them. Coplanar continuity with no gap between the turnaround passages 30 in the end caps 4 and the associated sleeves 6 inside the fore-and-aft bores 9 in the carriage 3 helps the rollers 5 transfer smoothly from the turnaround passages 30 to their associated return passages 10 and also from the return passages 10 to the turnaround passages 30 in a circulating manner.

The linear motion guide unit of the present invention has the constructional feature that the slider 2 is made with holes 37 that open to outward end surfaces 47 of the forward and aft end caps 4 and reach the turnaround passages 30, and further that lubricant reservoirs 25 of porous compact impregnated with lubricant lie on the outward surfaces 47 of the slider 2, the lubricant reservoirs 25 being each composed of a major plate 45 lying on the outward surfaces 47 of the slider 2 and a nose 26 raised above the major plate 45 to extend into the associated hole 37 in such a way a tip 46 thereof forms part of the curved wall of the associated turnaround passage 30 to come into touch with the rollers 5 to apply lubricant around the rollers 5 as the rollers 5 roll through the turnaround passage 30. Especially as shown in FIGS. 8 to 10, the nose 26 of the lubricant reservoir 25 in the right side bulgy potion 50 of the end cap major part 8 is placed to protrude above the curved outside half 36 of the longer turnaround passage 30A, while the other nose 26 of the lubricant reservoir 25 in the left side bulgy potion 50 is placed to protrude above the curved outside half 36 of the longer turnaround passage 30A. With the linear motion guide unit constructed as stated earlier, installation of the end caps 4 with the lubricant reservoirs 25 on the forward and aft ends 35 of the carriage 3 makes the successive rollers 5 possible to come into rolling-contact with the noses 26 of the lubricant reservoirs 25 in all the four classes of the circulating circuits 49. Thus, the noses 26 wick the lubricant from the major plates 45 of the lubricant reservoirs 35 onto the rollers 5 rolling through the turnaround passages 30. In order to more encourage the positive lubrication to the rollers 5, the lubrication system of the present invention constructed as stated earlier is better suited for the linear motion guide unit of the class in which the stroke length in reciprocation is relatively large.

Figure 11:
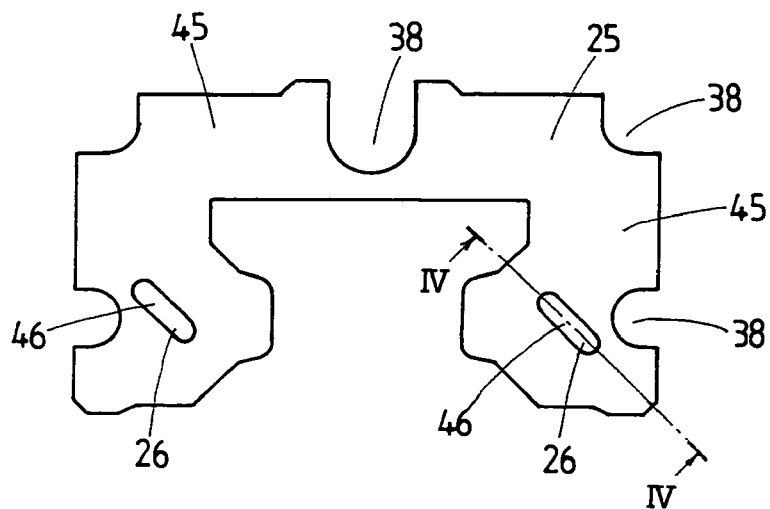
FIG. 11 is a view in rear elevation showing a version of a lubricant reservoir of FIG. 4.
Figure 12:
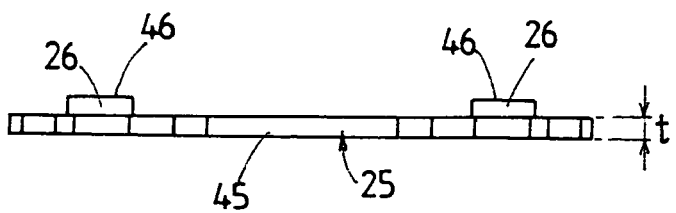
FIG. 12 is a view in bottom of the lubricant reservoir of FIG. 11.

The lubricant reservoir 25 illustrated in FIGS. 11 and 12 is made of porous or cellular plate-like compact of physical dimension spreading over nearly the entire size of the outward surface 47 of the end cap 4 and thickness (t). The porous compact product for the lubricant reservoir 25 is prepared by first compacting finely powdery ultrahigh molecular weight synthetic resin, and subsequently sintering at elevated temperature the resulting compact to thereby finish sintered resinous member having open-porous or open-cellular texture in which pores or cells preserved among fine particles are made open to each other through interstices or channels inside the sintered product. The lubricant reservoir 25 serves to absorb lubricant, which fills pores or cells to be held in the cellular texture and later applied to the rollers 5. Especially, the lubricant reservoir 25 may be made of a sintered product of, for example, finely powdery ultrahigh molecular weight polyethylene. Besides being made of sintered resinous material, the lubricant reservoir 25 can be made of any material selected from foam polyurethane of porous texture including continuing pores or cells therein, certain compacts from a mixture of finely powdery ultrahigh molecular weight polyethylene and lubricant processed under pressure together with the application of heat, and thermally fused fibers of porous texture in which fibers are partially fused with the application of heat. In any material, the pores or cells in the lubricant reservoir 25 are preserved in positive continuous or open relations. With the linear motion guide unit shown in FIG. 3, the left-side lubricant reservoir 25 in FIG. 3 is installed in a way the nose 26 thereof is raised into the longer turnaround passage 30A of any one of the paired circulating circuits 49, thereby applying the lubricant around the rollers 5, while the right-side lubricant reservoir 25 in FIG. 3 is installed in a way the nose 26 thereof is raised into the longer turnaround passage 30A of the other of the paired circulating circuits 49, thereby applying the lubricant around the rollers 5.

Figure 5:
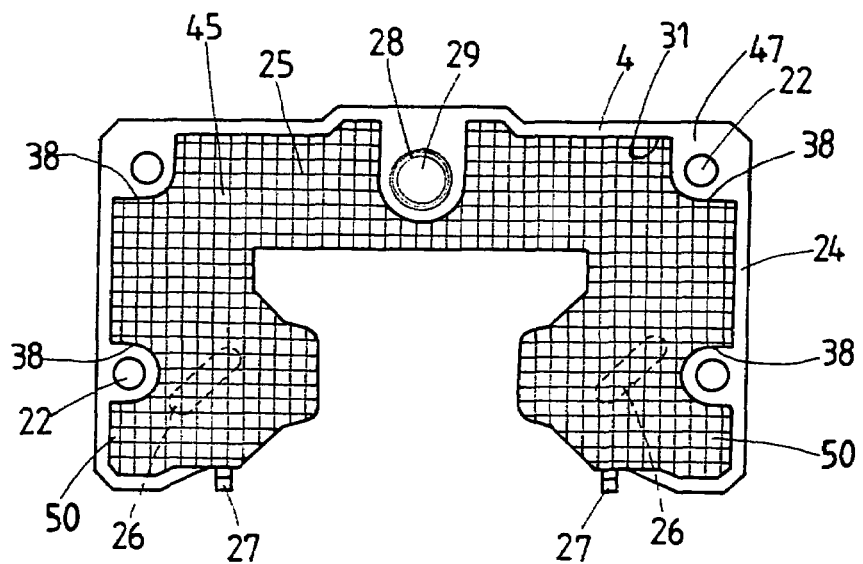
FIG. 5 is a view in front elevation showing the end cap of FIG. 4.

Moreover, the lubricant reservoirs 25 are arranged in a way lying on the outward end surfaces 47 of the end caps 4 that are secured on the forward and aft ends of the carriage 3. The lubricant reservoirs 25, as shown in FIG. 3, fit into recesses 31 made in the outward end surfaces 47 of the end caps 4, and further the end seals 15 are secured over outside end surfaces of the lubricant reservoirs 25. The lubricant reservoir 25, as shown in FIGS. 5 and 6, fits snugly in the recess 31 inside the associated end cap 4 in a way not protruding outside the outward end surface 47. As an alternative, although not shown, the lubricant reservoir 25 may be simply interposed between the end cap 4 and the end seal 15, instead of being fitted in the recess 31 concaved in the outward end surface 47 of the end cap 4.

Figure 4:
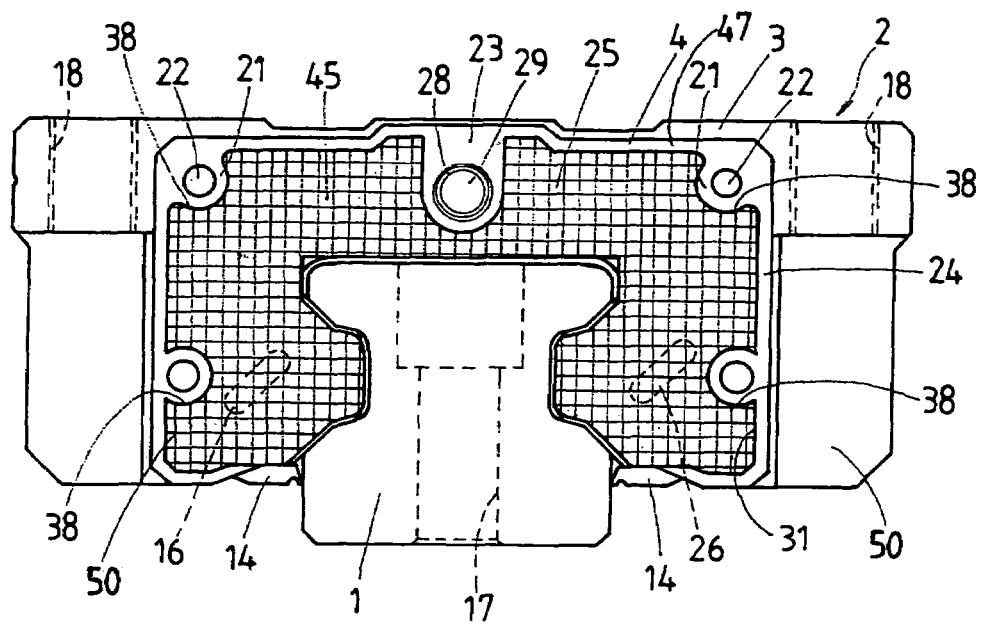
FIG. 4 is a view in front elevation of the linear motion guide unit of FIG. 1, but in which an end seal is removed to expose an end cap.

Referring to FIGS. 4 and 5, there is shown the first version of the end cap 4 to be incorporated in the linear motion guide unit of the present invention. The outward end surface 47 of the end cap 4 sinks, leaving some local areas around the bolt holes 22 and the lubrication port 29 and also a first frame 24 of an outside peripheral edge, to provide the recess 31 to accommodate the lubricant reservoir 25 therein. On the outward end surface 47 of the end cap 4, there is made the recess 31 inside the peripheral frame 24 extending along the outside edge. And here the outside edge on the end cap 4 refers to an edging portion lying farther out than the lower seals 14 while the inside edge on the end cap 4 refers to an edging portion lying farther inside than the lower seals 14, or an edging portion recessed inside the slider 2 to fit over or conform to the guide rail 1. In the version disclosed now, there is made no frame edging the inside of the recess 31 on the end cap 4. The lubricant reservoir 25 fits snugly in the recess 31 inside the first peripheral frame 24 of the end cap 4. Moreover, the lubricant-reservoir 25 fits closely in the recess 31 on the outward end surface 47 of the end cap 4 in a way somewhat apart from the guide rail 1 so as not to touch the guide rail 1. The lubricant reservoir 25 is disposed such that the major plate 45 thereof spreads across nearly the entire of the end cap 4. The peripheral frame 24 functions to protect the lubricant reservoir 25 against foreign contaminants including fine particles, debris or grits, cutting fluids, and so on which might invade from the outside of the slider 2.

With the linear motion guide unit of the present invention, especially, the lubricant reservoir 25 has sidewise spaced noses 26 that extend through the holes 37 in the end cap major part 8 to reach the widthwise opposing circulating circuits 49, respectively. The lubricant reservoir 25, although shown in the form of monolithic plate in FIGS. 4 and 5, alternatively can be made in split type of two halves, not shown, which are assigned to respective sets of paired circulating circuits 49. The lubricant reservoir 25 is made such that the major plate 45 thereof spreads across nearly the entire of the end cap 4 save for some specific areas 38 around the bolt holes 22 that are used to fasten the end caps 4 to the carriage 3. Moreover, if the lubrication port 29 shown in FIG. 5 is unused, the relieved area for the lubrication port 25 is unnecessary. When only the lubricant retained in the lubricant reservoir 25 is quite good enough for sustainable positive lubrication, there will be no need of the provision of the lubricant port 29 on the side of the end cap 4. The lubricant reservoir 25 of the geometric dimension spreading across nearly the entire of the end cap 4 gets large in volume impregnated with lubricant and, therefore, can be made less in thickness, helping make the slider 2 less in the overall fore-and-aft length. Besides, it will be appreciated that the lubricant reservoir 25, when receding into the recess 31 of the end cap 4, has no influence on the overall length of the slider 2.

With the linear motion guide unit of the present invention, the paired circulating circuits 49 to allow the rollers 5 rolling through there are formed in the widthwise opposing sides of the slider 2, one pair to each side. In the slider 2, the turnaround passages 30 in the paired circulating circuits 49 are arranged to intersect with one another in a staggered relation in the traveling direction of the slider 2. The rollers 5 rolling through any one of the paired turnaround passages 30A and 30B are lubricated with the lubricant reservoir 25 lying in any one of the forward and aft end caps 4 while the other rollers 5 rolling through the other of the paired turnaround passages 30A and 30B are lubricated with the lubricant reservoir 25 lying in the different end cap 4. The lubricant reservoirs 25 each have the widthwise spaced noses 26 that are raised above the major plates 45 at the locations corresponding to the turnaround passages 30 in the sidewise opposing bulgy portions 50. The raised noses 26 are made in elliptic figure elongated in circulating direction of the rollers 5 with askew in the same direction. With the linear motion guide unit constructed as stated earlier, the sustainable proper lubrication to the rollers 5 can be accomplished by the lubrication system simple in construction: only the noses 26 that are raised above the lubricant reservoir 25 to extend through the holes 37 in the end cap 4 to expose themselves to the turnaround passages 30. The lubrication system in the linear motion guide unit of the present invention is moreover envisaged to the application of lubricant to the rollers 5 heading towards the load-carrying races 20. In the linear motion guide unit of the present invention, thus, the rollers 5 are first applied with the lubricant transferred from the noses 26 of the lubricant reservoir 25 to the rollers 5 during rolling through the turnaround passages 30, and then the rollers 5 coated with lubricant film enter the load-carrying races 20 in a circulating manner, accomplishing positive lubrication throughout the circulating circuits.

With the linear motion guide unit of the present invention, one of the paired turnaround passages 30 in the end cap 4 is the longer outside turnaround passage 30A and the other is the shorter inside turnaround passage 30B. The lubricant reservoir 25 fits in the outward end surface of the end cap 4 in a way the sidewise spaced noses 26 thereof expose themselves to their associated longer outside turnaround passages 30A to define partially the curved outside walls 46 of the longer outside turnaround passages 30A. The noses 26 raised above the lubricant reservoirs 25, as shown in FIGS. 8 to 10, are each formed to have an exposed crown 46 of elliptic figure whose major axis lies in parallel with the traveling direction of the rollers 5 to ensure rolling-contact with the rollers 5 over a long distance enough to apply significant lubricant to the rollers 5. The noses 26 are each made to have, for example a length (L) that extends beyond a straight area (m) in the longer turnaround passage 30 to merge in part into rounded areas in the longer turnaround passage 30, and a width (B) less than the axial length (RL) of the roller 5. As an alternative, the raised nose 26 may be made somewhat prominent into the associated turnaround passage 30 so long as the prominence of the nose 26 is as slight as causing no gap in the turnaround passage 30, which would otherwise affect the rolling motion of the rollers 5.

Figure 13:
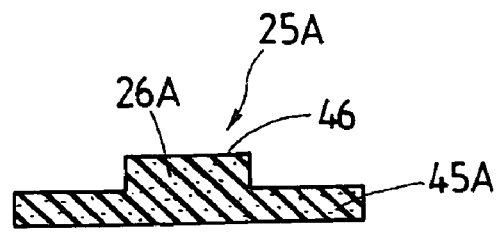
FIG. 13 is a view in transverse section of the lubricant reservoir of FIG. 11, the view being taken on the plane of the line IV-IV of that figure.
Figure 14:
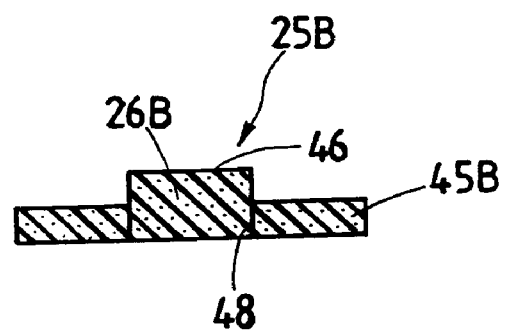
FIG. 14 is a view in transverse section of another version different in construction from the lubricant reservoir of FIG. 11.
Figure 15:
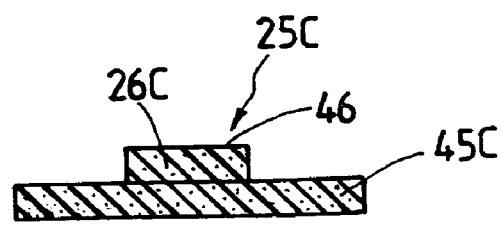
FIG. 15 is a view in transverse section of a further another version different in construction from the lubricant reservoir of FIG. 11.

As alternatives, moreover, the lubricant reservoir 25 can be made in different figures, for example shown in FIGS. 13 to 15. A nose 26A shown in FIG. 13 is made integral with a major plate 45A. Noses 26B and 26C in versions shown in FIGS. 14 and 15 are made separately from major plates 26B and 26C, followed by being joined to the respective major plates 26B and 26C. With the lubricant reservoir 25A shown in FIG. 13, the major plate 45A lying on the outward end surface 47 of the end cap 4 in the slider 2 is made integral in construction with the nose 26A raised above the major plate 45A to protrude into the associated hole 37 bored in the end cap 4. In the lubricant reservoir 25B shown in FIG. 14, the major plate 45B to lie on the outward end surface 47 of the end cap 4 in the slider 2 and the nose 26B to extend into the associated hole 37 in the end cap 4 are made separately from one another. The nose 26B fits into an opening 48 made in the major plate 45B. In this version, only the nose 26B can be made of any one material selected from porous polyurethane, foam rubber or porous heat fused fibers whose pores are well preserved, or porous stick of synthetic resin filament bundle. Finally, the lubricant reservoir 25C shown in FIG. 15 is made up of the major plate 45C to lie on the outward end surface 47 of the end cap 4 in the slider 2, and the nose 26C to extend into the associated hole 37 in the end cap 4. The nose 26C is made separately from the major plate 45C, followed by being joined to the major plate 26C. Although the lubricant reservoir 25 can be made in various versions as stated earlier, it is preferred to make the nose 26 with any material that is rich in elasticity such that the nose 26 prominent into the associated turnaround passage 30 does not lead to any obstruction against the rolling travel of the rolling elements. Moreover, the nose 26 is needed to wick easier the lubricant retained in the major plate 45 onto the rollers 5 as they roll with keeping rolling-contact with nose 26. This means that the nose 26 has to be made in construction so as not to thwart its pumping ability to deliver the lubricant from the major plate 45 to the rolling elements 5 via the nose 26. Thus, it is preferable to determine the material and construction of the lubricant reservoir 25 with operation and design considerations as recited earlier.

Figure 16:
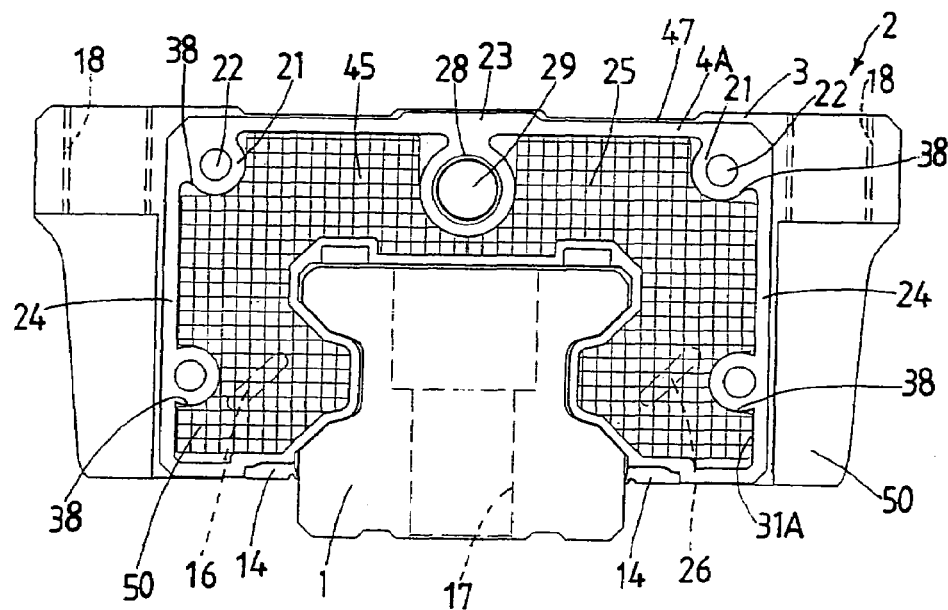
FIG. 16 is a view in front elevation of another version different in construction from the linear motion guide unit of FIG. 1, but in which an end seal is removed to expose an end cap.
Figure 17:
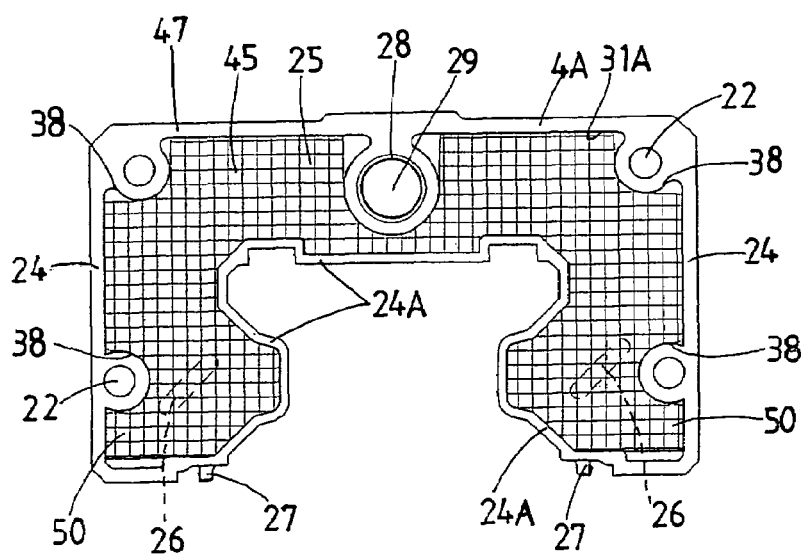
FIG. 17 is a view in front elevation of a further another version different in construction from the linear motion guide unit of FIG. 16, but in which an end seal is removed to expose an end cap.

Finally referring to FIGS. 16 and 17, there are shown another version of the end cap 4A for the linear motion guide unit of the present invention.

The outward end surface 47 of the end cap 4A sinks, leaving some local areas around the bolt holes 22 and the lubrication port 29 and also the outside frame 24 and an inside second frame 24A, to provide a recess 31A to fit over the lubricant reservoir 25. On the outward end surface 47 of the end cap 4A, there are made the outside frame 24 extending along the sidewise outward edge lying farther out than the lower seals 14, and the inside frame 24A extending along the sidewise inward edge lying farther inside than the lower seals 14. Thus, the recess 31A is defined between the frames 24 and 24A. The lubricant reservoir 25 fits snugly in the recess 31 defined between frames 24 and 24A. Compared with the end cap 4A according to the first version described earlier, the end cap 4A is substantially equivalent or identical to the previously described first version but is made with the inside frame 24A lying along the sidewise inward edge of the end cap 4. To that extent, the components have been given the same reference characters, so that the previous description will be equally applicable. Besides the first frame 24 lying along the sidewise outside edge, the end cap 4A constructed according to the version stated now has another frame 24A extending along the sidewise inside edge to surround the lubricant reservoir 25 around its substantially entire periphery by both the frames 24 and 24A, thereby more effectively preventing the lubricant reservoir 25 against foreign contaminants including fine particles, debris, and grit or dust, cutting fluids, and so on which might invade from not only the outside but also the inside of the slider 2. Moreover, only fitting the lubricant reservoir 25 into the recess 31A made in the outward end surface 47 of the end cap 4A is sufficient to secure the lubricant reservoir 25 to the end cap 4A. Thus, the lubricant reservoir 25 can be mounted surely on the end cap 4A with ease. The lubricant reservoir 25 fits snugly in the recess 31A without protruding above the outward end surface 47 of the end cap 4A.

What is claimed is:

1. A linear motion guide unit comprising an elongated guide rail, a slider movable lengthwise of the elongated guide rail in a sliding manner, and more than one rolling element running through a load-carrying race defined between the guide rail and the slider, the rolling element being allowed to roll through a circulating circuit made up of the load-carrying race, a return passage made in the slider in parallel with the race, turnaround passages joining the race and the return passage together with one another;

wherein the slider is provided on forward and aft end surfaces thereof with lubricant reservoirs of porous compact impregnated with lubricant, the forward and aft end surfaces being each made with a hole open to the associated turnaround passage, and the lubricant reservoirs being each provided with a nose that extends into the hole in a way exposing its tip end to the turnaround passage to define partially a wall surface of the turnaround passage, coming into rolling-contact with the rolling element rolling through the turnaround passage to apply the lubricant on the rolling element, and wherein the lubricant reservoirs are each made up of a major plate and a nose that is made either integral with the major plate or separately from the major plate, followed by being joined with the major plate.

2. A linear motion guide unit as defined in claim 1, wherein the porous compact for the lubricant reservoir is made of sintered resinous member that are prepared by compacting finely powdery ultrahigh molecular weight synthetic resin under pressure together with the application of heat, the resulting sintered resinous member having open-porous texture in which pores are made open to each other through interstices among resinous particles inside the sintered member, and wherein the lubricant fills in the pores.

3. A linear motion guide unit constructed as defined in claim 1, wherein the slider is comprised of a carriage has the return passage and a raceway groove to form the load-carrying race, forward and aft end caps arranged to provide the forward and aft end surfaces and made therein with the turnaround passages, and end seals applied over the lubricant reservoirs lying on the forward and aft end surfaces of the end caps and fastened to the carriage.

4. A linear motion guide unit as defined in claim 3, wherein the lubricant reservoirs are made to spread across nearly the entire of the forward and aft end surfaces of the end caps.

5. A linear motion guide unit as defined in claim 3, wherein a pair of the circulating circuits is made in each of widthwise opposing sides of the end caps, wherein the turnaround passages of the paired circulating circuits intersect each other in the end caps in staggered relation in sliding direction of the slider, and wherein the lubricant reservoirs are placed in the end caps, one to each end cap, in a way one of the lubricant reservoirs applies the lubricant around the rolling element rolling through one of the paired turnaround passages while the other lubricant reservoir applies the lubricant around the rolling element rolling through the other of the paired turnaround passages.

6. A linear motion guide unit constructed as defined in claim 3, wherein the paired turnaround passages are staggered one another in a sliding direction of the slider to provide an outward turnaround passage and an inward turnaround passage which are spaced apart away from one another in the end caps, and wherein the noses of the lubricant reservoirs expose themselves to the respective outward turnaround passages.

7. A linear motion guide unit as defined in claim 3, wherein the outward end surfaces of the end caps sink leaving outside edges to make outside frames, and wherein the lubricant reservoirs fit into recesses defined with the outside frames.

8. A linear motion guide unit as defined in claim 7, wherein the outward end surfaces of the end caps sink leaving inside edges to make inside frames, besides the outside edges to make the outside frames, and wherein the lubricant reservoirs fit into recesses each defined between the outside frame and the inside frame.

9. A linear motion guide unit comprising an elongated guide rail, a slider movable lengthwise of the elongated guide rail in a sliding manner, and more than one rolling element running through a load-carrying race defined between the guide rail and the slider, the rolling element being allowed to roll through a circulating circuit made up of the load-carrying race, a return passage made in the slider in parallel with the race, turnaround passages joining the race and the return passage together with one another;

wherein the slider is provided on forward and aft end surfaces thereof with lubricant reservoirs of porous compact impregnated with lubricant, the forward and aft end surfaces being each made with a hole open to the associated turnaround passage, and the lubricant reservoirs being each provided with a nose that extends into the hole in a way exposing its tip end to the turnaround passage to define partially a wall surface of the turnaround passage, coming into rolling-contact with the rolling element rolling through the turnaround passage to apply the lubricant on the rolling element, and wherein the noses of the lubricant reservoirs exposed to the turnaround passages are each formed to have an exposed crown of elliptic figure whose major axis lies in parallel with the traveling direction of the rollers.

10. A linear motion guide unit comprising an elongated guide rail, a slider movable lengthwise of the elongated guide rail in a sliding manner, and more than one rolling element running through a load-carrying race defined between the guide rail and the slider, the rolling element being allowed to roll through a circulating circuit made up of the load-carrying race, a return passage made in the slider in parallel with the race, turnaround passages joining the race and the return passage together with one another;

wherein the slider is provided on forward and aft end surfaces thereof with lubricant reservoirs of porous compact impregnated with lubricant, the forward and aft end surfaces being each made with a hole open to the associated turnaround passage, and the lubricant reservoirs being each provided with a nose that extends into the hole in a way exposing its tip end to the turnaround passage to define partially a wall surface of the turnaround passage, coming into rolling-contact with the rolling element rolling through the turnaround passage to apply the lubricant on the rolling element, and wherein the lubricant reservoir is made up of a major plate bored with a hole, and a nose made separately from the major plate, followed by fitted into the hole in the major plate.

* * * * *